United States Patent Office 3,730,694
Patented May 1, 1973

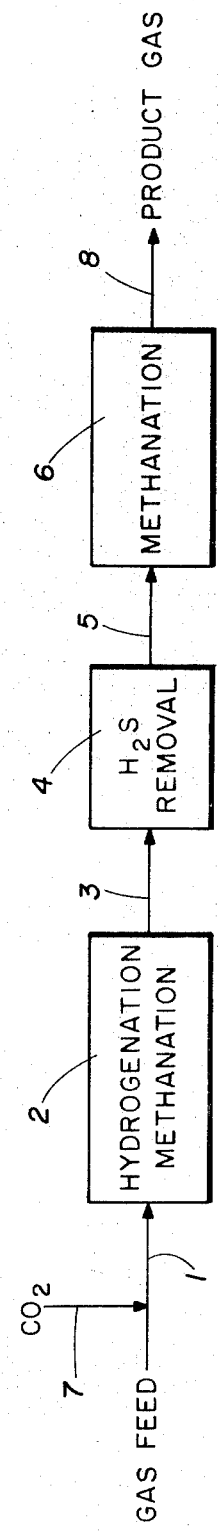

3,730,694
FUEL GAS UPGRADING
Donald K. Wunderlich, Richardson, Tex., assignor to
Atlantic Richfield Company, New York, N.Y.
Filed Aug. 11, 1971, Ser. No. 170,722
Int. Cl. C01b 2/14
U.S. Cl. 48—213
6 Claims

ABSTRACT OF THE DISCLOSURE

A method for upgrading a fuel gas feed by subjecting the feed gas to conditions which convert carbon monoxide to methane, saturate olefins, remove sulfur, and, if necessary, adding or retaining carbon dioxide to react with excess hydrogen present after conversion of the carbon monoxide and saturation of the olefins thereby providing a product gas which has an increased hydrocarbon content and heating value and a reduced sulfur and carbon monoxide content.

BACKGROUND OF THE INVENTION

Heretofore, off gases from various industrial operations; e.g., operations where synthetic crude oil is obtained from the liquefaction of coal, the retorting of oil shale, the extraction of bitumen from tar sands, and the like; have a low heating value, i.e., less than 1000 B.t.u.'s per standard cubic foot of gas, and contain a substantial amount of hydrogen and carbon monoxide. Because such gases are poor fuels, they command a low price if salable at all.

SUMMARY OF THE INVENTION

According to this invention, the above low value gases are upgraded to a pipeline quality gas which has a heating value of at least 1000 B.t.u.'s per standard cubic foot of gas. An upgraded fuel gas product is provided treating the gas under various conditions described in detail hereinafter so as to utilize the hydrogen present in the gas to saturate the olefins present and to react with the carbon monoxide to convert same to methane and water, sufficient carbon dioxide being provided (added to or retained in) the stream, if necessary, to react with any remaining hydrogen and convert the carbon dioxide to methane and water. The gaseous product has a substantially increased hydrocarbon content and heating value and minimum free hydrogen and free carbon dioxide content. In addition, during the processing sulfur is removed so that the product gas is also a low sulfur fuel gas.

Thus, an important aspect of this invention is the regulation of carbon dioxide content in the feed gas to first saturate olefins and methanate carbon monoxide followed by the remaining carbon dioxide being present in an amount sufficient to react with any remaining free hydrogen so as to minimize the hydrogen and carbon dioxide present in the product while maximizing the heating value of the product.

Accordingly, it is an object of this invention to provide a new and improved method for upgrading low heating value off gases. It is another object to provide a new and improved method for producing a low sulfur, high heating value fuel gas. It is another object to provide a new and improved method for upgrading a synthetic fuel gas obtained from operations which produce a synthetic crude oil product.

Other aspects, objects and advantages of this invention will be apparent to those skilled in the art from this disclosure and the appended claims.

DETAILED DESCRIPTION OF THE INVENTION

The drawing shows a block flow diagram according to one process within this invention.

More specifically, the drawing shows feed gas to be upgraded passing by way of pipe 1 to a first zone 2 wherein the reaction conditions favor the conversion of carbon monoxide to methane and the saturation of olefins such as monolefins and diolefins to the corresponding saturated aliphatic hydrocarbons. Under the first reaction conditions of zone 2 any mercaptans present are broken up to form the corresponding hydrocarbon plus hydrogen sulfide.

The product gas from zone 2 is passed by way of pipe 3 to second reaction zone 4 wherein the second reaction conditions are maintained so as to remove hydrogen sulfide from the gas present.

The product of second reaction zone 4 is then passed by way of pipe 5 to third zone 6 wherein the reaction conditions are maintained so that any remaining carbon monoxide reacts with any remaining hydrogen to form methane.

If, after the original feed gas in pipe 1 passes through zones 2, 4 and 6, there is still hydrogen left in the gas in zone 6, carbon dioxide can be externally supplied by way of pipe 7 in an amount so that at least by the end of zone 6, any remaining hydrogen will have reacted with the carbon dioxide added to form additional methane so that the product gas from zone 6 in pipe 8 is substantially free of hydrogen, carbon monoxide, and carbon dioxide, if any carbon dioxide is added, and contains substantially only saturated hydrocarbons. Thus, product gas in pipe 8, in relation to the feed gas in pipe 1, is substantially increased as to its hydrocarbon content and heating value while at the same time substantially reduced as to sulfur, carbon monoxide, and carbon dioxide content.

Generally, the feed gas for pipe 1 can be any fuel gas which contains hydrogen, carbon monoxide, methane, and saturated and/or unsaturated hydrocarbons having from 2 to 3 carbon atoms per molecule, inclusive. The feed gas can contain other materials, such as hydrogen sulfide and mercaptans, e.g., mono- or polythiols having 2 to 3 carbon atoms per molecule, inclusive, as well as other hydrocarbons such as butane, isobutane, pentane, butylenes, and the like. Generally, a major portion of the feed gas will be made up of hydrogen, carbon monoxide, carbon dioxide, methane and saturated and unsaturated hydrocarbons having 2 to 3 carbon atoms per molecule, hydrogen sulfide and/or mercaptan. Of these specific materials a preponderant amount can be hydrogen so that even after hydrogen has reacted with all the carbon monoxide present and saturated all of the olefins present, there still is a substantial amount of unreacted hydrogen remaining. When this is the case, substantial amounts of carbon dioxide can be added from external sources to react with the remaining unreacted hydrogen so that substantially all the hydrogen that was present in the feed gas is utilized and substantially all the carbon monoxide present and carbon dioxide added, if any, are converted to the higher heat value methane.

The amount of carbon dioxide added, if any, will therefore vary widely depending upon the composition of the particular feed gas employed and the particular conditions and operations carried out subsequently on the feed gas to convert the carbon monoxide to methane and to saturate the olefins. Generally, sufficient carbon dioxide is provided to react with all hydrogen left thereby forming methane and water, preferably about ¼ mol of carbon dioxide will be provided per mol of hydrogen present, if any, after saturation of the olefins present and methanation of the carbon monoxide present in the feed gas. It should be noted that carbon dioxide can be added at one or more places along the flow diagram of the drawing, so that rather than adding all the carbon dioxide to pipe 1, all or any part of the carbon dioxide can be added at various points downstream of pipe 1 such as to pipes 3 and 5, and one or more of zones 2, 4 and 6. Carbon dioxide is preferably added at pipe 1 so that it will be present during the reaction conditions of each of the three zones thereby being available for reaction with hydrogen at all times and insuring that by the time the product gas reaches pipe 8, the carbon dioxide has reacted with any excess hydrogen.

The feed gas, after the addition of any carbon dioxide, is then ready for hydrogenation, methanation, and desulfurization as represented by reaction zones 2, 4 and 6. Generally, the reaction conditions in each of the three zones will be maintained within the ranges of from about 600 to about 900° F., from about 200 to about 700 p.s.i.g., and from about 500 to about 2000 standard cubic feet per hour per cubic foot of catalyst, solid reactant, or other solid particulate material present in any of the reaction zones. In the first reaction zone 2 a catalyst is preferably used which is substantially resistant to sulfur poisoning and which is generally known as a hydrogenation catalyst. Since this type catalyst under the above condition will promote the saturation of olefins with hydrogen, the conversion of carbon monoxide to methane, and the conversion of mercaptans to the corresponding hydrocarbon plus hydrogen sulfide.

The second reaction zone 4 contains a material such as a reactant which will combine chemically with hydrogen sulfide to produce a sulfided reactant thereby effectively removing hydrogen sulfide from the gas passing through zone 4.

The catalyst employed in zone 6 can be a much more active hydrogenation catalyst than that employed in zone 2 which includes a large number of catalysts that are subject to sulfur poisoning. This is so because sulfur has been removed by way of zone 4 so that sulfur poisoning of the catalyst employed is no longer a concern as it was with zone 2 and so that any residual carbon monoxide and carbon dioxide not already converted to methane will most surely be converted in zone 6 due to the more active hydrogenation catalyst.

Suitable hydrogenation and methanation catalysts include the metals, preferably in subdivided form such as powders, of iron, cobalt, nickel, vanadium, molybdenum, or tungsten, or compounds of these metals such as the halides, oxides, sulfides, molybdates, sulfates, or oxalates. Mixtures and other combinations of two or more of these metals and/or compounds of these metals can be employed as desired. Exemplary materials that have heretofore been employed as hydrogenation catalysts include the chlorides of nickel, iron, and cobalt. There can also be used sulfates of iron, cobalt, and nickel, molybdates of cobalt, nickel, and iron, sulfides of tin, tungsten, molybdenum, or nickel, and combinations thereof, powders of metals such as nickel, cobalt, or iron. Oxides or combinations thereof can also be used such as oxides of iron alone or in combination with nickel oxide, oxides of tungsten alone or in combination with nickel oxide, oxides of nickel, oxides of cobalt alone or in combination with nickel oxide, vanadium oxide, and the like.

The catalyst can be supported on a carrier material such as alumina, magnesia, silica, titania, zirconia, fuller's earth, kieselghur, clay such as kaolin (Kaolinite, Halloysite, Dickite, Nacrite, and Endellite) or bentonite (Montmorillonite, Beidellite, Nontronite, Hectorite, and Saponite), attapulgite, and sepiolite, carbon, and the like. For example, combinations of iron oxide, alumina, and/or silica and/or titania can be employed. Also, oxides of molybdenum, oxides of tungsten, oxides of magnesium, sulfides of tungsten, and the like can be combined with alumina and/or silica and/or fullers earth, and the like. When carbon is employed as a support it can be in the form of wood char, coal char, activated carbon, or any other carbonaceous material containing a major amount of carbon.

In the above examples the iron, cobalt, and nickel can have valences of two or three, the vanadium a valence of five, four, three, or two, and the molybdenum and tungsten a valence of six, five, four, three, or two.

Each support material can be employed alone or in combination with other support materials and is used in an amount which supports substantially all of the catalyst present.

One skilled in the art knows which of the above catalysts are more subject to deactivation by sulfur poisoning than the others. For example, it is known that the cobalt and molybdenum catalysts are not as subject to sulfur poisoning nickel catalysts so that from the above one skilled in the art will know the desired catalysts for zones 2 and 6 in accordance with the teachings of this invention.

The reactant employed in zone 4 for reacting with hydrogen sulfide can be any well-known material which will take up sulfur such as activated carbon, alkaline metals, zinc, copper, nickel, cadmium, and oxides of these metals. Of course two or more of these materials can be employed in zone 4.

It should be noted that in lieu of three separate reaction zones such as those shown in the drawing, a single-staged zone can be employed such as a vertical tower where the feed gas is fed into the top, the gas as it passes downwardly toward the bottom of the tower coming into contact with in sequence, the hydrogenation-methanation catalyst of zone 2 followed by the hydrogen sulfide removal material of zone 4 and finally the more active methanation material of zone 6 the desired product gas of pipe 8 being recovered from the bottom of the tower.

Example

A process is carried out using the flow diagram of the drawing wherein the gas feed comprises 42.3 percent hydrogen, 4.1 percent carbon monoxide, 35.7 percent methane, 13.3 percent ethane, and 4.6 percent ethylene, and trace amounts of sulfur compounds and carbon dioxide (the fraction of which is to be calculated), all percents being by volume based on the total volume of the feed gas. The unit heat value of the carbon dioxide free feed gas is 737 B.t.u.'s per standard cubic foot of the gas. The hydrogen required for methanation of the carbon monoxide is 12.3 mols, while the hydrogen required to saturate the ethylene is 4.6 mols thereby leaving 25.4 mols of hydrogen remaining unreacted. Carbon dioxide in the total amount of 6.35 mols is added to and/or left in the feed gas as the amount of carbon dioxide required to react with the remaining hydrogen after all the carbon monoxide has been converted to methane and all the ethylene has been saturated.

The feed gas, after the addition of carbon dioxide, is then heated to a temperature of 750° F., pressurized to 400 p.s.i.g., and passed to zone 2 at a space rate of 1000 standard cubic feet per hour per cubic foot ° F. hydrogenation catalyst present in zone 2. The temperature, pressure and space rate of the gas as it passes from zone 2 through zones 4 and 6 is maintained within the ranges of 600 to 900° F., 200 to 700 p.s.i.g., and 500 to 2000 standard cubic feet per hour per cubic foot of particulate material in the particular zone.

The catalyst present in zone 2 is a commercially available cobalt and molybdenum catalyst supported on alumina. In zone 2 hydrogen reacts with the ethylene to form ethane, hydrogen reacts with the carbon monoxide to form methane and water, hydrogen reacts with the carbon dioxide to form methane and water, and hydrogen reacts with any sulfur containing compounds, particularly mercaptans, present to form the corresponding hydrocarbon and hydrogen sulfide (for example, $CH_3SH$ reacts with hydrogen to form methane and hydrogen sulfide). The gas then passes to zone 4 which contains zinc oxide and in this zone zinc oxide reacts with the hydrogen sulfide to form zinc sulfide and water thereby removing hydrogen sulfide from the gas passing through zone 4. The desulfurized gas then passes to zone 6 which contains nickel supported on alumina and wherein any remaining carbon monoxide and carbon dioxide reacts with remaining hydrogen to form methane and water.

The product gas in pipe 8 contains substantially no hydrogen, carbon monoxide, carbon dioxide, or hydrogen sulfide but does contain 46.15 percent methane and 17.90 percent ethane, both percents being by volume based on the total volume of the product gas. The product gas also has a heating value of 1107 B.t.u.'s per standard cubic foot of product gas. Thus, it can be seen that the feed gas not only is upgraded as to its heating value and hydrocarbon content but also is desulfurized.

The product gas in pipe 8 can be cooled and compressed to conventional pipeline temperature and pressure for sale to pipeline or for other use as desired.

Reasonable variations and modifications are possible within the scope of this disclosure without departing from the spirit and scope of this invention.

I claim:

1. A method for upgrading a fuel gas feed containing hydrogen, carbon monoxide, methane, saturated and unsaturated hydrocarbons having from 2 to 3 carbon atoms per molecule, inclusive, and sulfur containing compounds including at least one of hydrogen sulfide and mercaptan, comprising providing carbon dioxide in an amount such that after the carbon monoxide has reacted with the hydrogen present to form methane and the unsaturated hydrocarbons have been saturated sufficient carbon dioxide is present to react with substantially all the remaining hydrogen, if any, to form methane; subjecting the feed gas to first reaction conditions which cause the hydrogen in the fed gas to react with the carbon monoxide to form methane, to saturate the unsaturated hydrocarbons, and to convert any sulfur containing compounds to the corresponding hydrocarbon plus hydrogen sulfide; subjecting the product of said first reaction conditions to second reaction conditions which substantially remove the hydrogen sulfide; subjecting the product of said second reaction conditions to third reaction conditions which cause any remaining carbon monoxide to react with hydrogen to form methane and to react any remaining hydrogen with carbon dioxide, if any, to form methane; thereby providing a product gas substantially increased in hydrocarbon content and heating value and substantially reduced in sulfur and carbon monoxide content.

2. A method according to claim 1 wherein the amount of carbon dioxide added is about ¼ mol per mol of hydrogen present after saturation of the olefins and methanation of the carbon monoxide.

3. A method according to claim 1 wherein said feed gas is obtained from at least one of liquefaction of coal, retorting of oil shale and extraction of tar sands.

4. A method according to claim 1 wherein said first reaction conditions comprise a temperature of from about 600 to about 900° F., a pressure of from about 200 to about 700 p.s.i.g., and a hydrogenation catalyst which is not substantially subject to deactivation by sulfur poisoning; said second reaction conditions comprise a temperature and pressure in the ranges specified for said first reaction conditions and a material which removes hydrogen sulfide from the gas being treated; and said third reaction conditions comprise a temperature and pressure in the ranges specified for said third reaction conditions and a hydrogenation catalyst which is subject to deactivation by sulfur poisoning.

5. A method according to claim 4 wherein said catalyst for said first reaction conditions is a cobalt- molybdenum hydrogenation catalyst, said hydrogen sulfide removing material for said second reaction conditions is at least one of activated carbon, alkali metals, Zn, Cu, Ni, Cd, and oxides of said metals; and said catalyst for said third reaction conditions is a nickel hydrogenation catalyst.

6. A method according to claim 1 wherein the volume percent of hydrogen present in said feed gas is greater than the combined volume percents of carbon monoxide and ethylene in said feed gas, and sufficient carbon dioxide is added to said feed gas so that after substantially all the carbon monoxide and ethylene have reacted with said hydrogen, substantially the entire remainder of hydrogen is used up by reacting with carbon dioxide.

References Cited
UNITED STATES PATENTS

| | | | |
|---|---|---|---|
| 3,531,267 | 9/1970 | Gould | 48—214 X |
| 3,551,124 | 12/1970 | Iwaki et al. | 48—213 X |
| 3,684,689 | 8/1972 | Patton et al. | 48—197 X |

MORRIS O. WOLK, Primary Examiner

R. E. SERWIN, Assistant Examiner

U.S. Cl. X.R.

48—197 R